(12) United States Patent
Ishii et al.

(10) Patent No.: US 7,276,016 B2
(45) Date of Patent: Oct. 2, 2007

(54) SPEED CONTROL METHOD FOR WORKING VEHICLE

(76) Inventors: Norihiro Ishii, 2-18-1, Inadera, Amagasaki-shi, Hyogo (JP); Hiroaki Shimizu, 2-18-1, Inadera, Amagasaki-shi, Hyogo (JP)

( * ) Notice: Subject to any disclaimer, the term of this patent is extended or adjusted under 35 U.S.C. 154(b) by 280 days.

(21) Appl. No.: 11/157,928

(22) Filed: Jun. 22, 2005

(65) Prior Publication Data

US 2005/0282682 A1    Dec. 22, 2005

(30) Foreign Application Priority Data

Jun. 22, 2004    (JP)    ............................ 2004-183928

(51) Int. Cl.
*B60W 10/10* (2006.01)
(52) U.S. Cl. ........................ 477/115; 477/42
(58) Field of Classification Search ................ 477/42, 477/115
See application file for complete search history.

(56) References Cited

U.S. PATENT DOCUMENTS

| | | | | |
|---|---|---|---|---|
| 4,122,732 A | * | 10/1978 | Chana | ......................... 477/69 |
| 4,263,826 A | * | 4/1981 | Hartz et al. | .................... 477/30 |
| 4,659,321 A | * | 4/1987 | Miyawaki | ..................... 474/28 |
| 5,014,574 A | * | 5/1991 | Sasajima et al. | .............. 477/68 |
| 5,362,286 A | * | 11/1994 | Satoh et al. | ................. 477/115 |
| 5,368,530 A | * | 11/1994 | Sanematsu et al. | ........... 477/43 |

FOREIGN PATENT DOCUMENTS

WO    WO 03/036138 A1    5/2003

* cited by examiner

*Primary Examiner*—Ha Ho
(74) *Attorney, Agent, or Firm*—Sterne, Kessler, Goldstein & Fox P.L.L.C.

(57) ABSTRACT

A working vehicle in which while an operation degree of a speed change operation member is increased from 0 to a certain value, the increase of the vehicle traveling speed is produced by a first increase rate of an engine rotation speed and a first increase rate of a speed ratio (output/input rotation speed ratio of a speed change mechanism) and while the operation degree of the speed change operation member is increased from the certain value, the engine rotation speed is kept to be the rated value and corresponding thereto, the increase rate of the speed ratio is set to a second increase rate of the speed ratio larger than the first increase rate of the speed ratio so that the vehicle traveling speed is always increased substantially in proportion to the acceleration operation of the speed change operation member.

17 Claims, 11 Drawing Sheets

SPEED CONTROL METHOD FOR WORKING VEHICLE

BACKGROUND OF THE INVENTION

1. Field of the Invention

The present invention relates to a method for controlling speed by controlling an output/input rotation speed ratio (hereinafter, simply referred to as a "speed ratio") of a speed change mechanism using a hydrostatic stepless transmission (HST) (including a hydraulic mechanical transmission (HMT)) and an engine rotation speed by an electronic governor, the method being adapted to a working vehicle, such as an agricultural tractor.

2. Related Art

Conventionally, there is a well-known working vehicle, such as an agricultural tractor, comprising an HMT or another speed change mechanism using an HST; an electronic governor for controlling vehicle traveling speed; and an accelerator operation member for setting the vehicle traveling speed, such as a pedal or a lever, manipulated by an operator. The electric governor controls a speed ratio of the speed change mechanism and an engine rotation speed in correspondence to an operation degree of the accelerator operation member. International Publication WO 03/036138 discloses a tractor serving as an example of such a working vehicle.

In the tractor of the document '138, a hydraulic pump or motor of an HST of the speed change mechanism is provided with a movable swash plate whose slanting angle is controlled for changing the speed ratio of the speed change mechanism, so as to compensate the vehicle traveling speed to the reduction of the engine rotation speed, when engine load is increased or the tractor turns on a headland.

In addition, with regard to such a working vehicle (for example, an agricultural tractor), generally, a low speed range is assigned to a working (off-road) speed range, and middle and high speed ranges are assigned to an on-road traveling speed range for on-road traveling between a working area (field) and a garage.

With regard to the above-mentioned working vehicle, the vehicle traveling speed is expected to change in proportion to the operation degree of the accelerator operation member. Especially, when the speed change mechanism of the working vehicle includes an auxiliary multi-stage speed change unit combined with the HST or HMT, and the auxiliary multi-stage speed unit is set into a high speed stage for the on-road traveling, it is desired that the variation pattern of the vehicle traveling speed relative to the accelerator operation be similar to that of an ordinary passenger car. A naturally noticed governing is that, in proportion to increase of the operation degree of the accelerator operation member, the opening degree of an engine throttle valve is increased so as to increase engine rotation speed, and simultaneously, the speed ratio of the speed change mechanism is increased (that is, the speed reduction ratio is reduced).

However, if this governing is performed, the variation range of engine rotation speed becomes too wide. Especially, if the accelerator operation member is set in the high speed set range, the engine rotation speed may become larger than a rated rotation speed predetermined in consideration of the engine load. With regard to the conventional governor, the above document '138 does not disclose how the engine rotation speed and the speed ratio of the speed change mechanism are controlled in response to the operation of the accelerator operation member so as to proportionally change the vehicle traveling speed with a feeling of a passenger car.

It is important that, to prevent the engine from being overloaded, the variation range of the engine rotation speed is reduced, and the variation range of the speed change mechanism is increased compensatively. However, even when the accelerator operation member is operated rapidly, the vehicle traveling speed cannot change desirably swiftly because the slow response of the speed ratio change. Further, the reduction of variation range of the engine rotation speed is disadvantageous in ensuring sufficient engine torque against high load applied on the engine.

Further, if the governing is based on that each of the engine rotation speed and the speed ratio of the speed change unit constantly changes in direct proportion to change of the accelerator operation degree, and even if the auxiliary multi-stage speed unit is set in a low speed stage, the engine power may be excessive or insufficient at the time of starting the engine because the weight of a vehicle is not suitable, or because a vehicle is stationary on a slope. The conventional governor of the above-mentioned document '138 reduces the engine rotation speed for controlling engine load, and increases the speed ratio of the speed change mechanism so as to compensate for the reduction of engine rotation speed, thereby ensuring a desired vehicle traveling speed. However, the governing does not resolve the above problems.

SUMMARY OF THE INVENTION

An object of the present invention is to provide a speed control method for a working vehicle by which a pattern of increase of vehicle traveling speed in response to acceleration operation of a speed change operation member is similar to that of an ordinary passenger car, while corresponding to various requirements, e.g., improvement of fuel efficiency, silencing of an engine, and countermeasure against excessive engine load.

To achieve the object, according to a first aspect of a method of the present invention, the vehicle traveling speed is increased by changing an engine rotation speed and/or a speed ratio, as an output/input rotation speed ratio, of a stepless speed change mechanism in correspondence to increase of an operation degree of a speed change operation member. The increased rate of the engine rotation speed and the increased rate of the speed ratio are changed complementarily to each other so that the vehicle traveling speed is increased substantially in proportion to the increase of the operation degree of the speed change operation member from 0 to a maximum value.

Accordingly, while the increased rate of the engine rotation speed (or of the speed ratio) in response to the acceleration operation of the speed change operation member is changed in correspondence to any requirement, the increase rate of the speed ratio (or of the engine rotation speed) is changed complementarily so as to ensure increase of the vehicle traveling speed substantially in proportion to the acceleration operation of the speed change operation member, similar to that of an ordinary passenger car. Therefore, a working vehicle can comfortably travel on road between a garage and a working area.

Preferably, in a second aspect according to the first aspect, as the operation degree of the speed change operation member is increased from 0 to a certain value, the engine rotation speed is increased by a first increase rate of the engine rotation speed so as to reach a rated value when the operation degree reaches the certain value, and the speed ratio is complementarily increased by a first increase rate of the speed ratio. As the operation degree of the speed change operation member is increased from the certain value, the engine rotation speed is maintained at the rated value or increased by a second increase rate of the engine rotation speed which is smaller than the first increase rate of the engine rotation speed, and the speed ratio is complementarily increased by a second increase rate of the speed ratio which is larger than the first increase rate of the speed ratio.

Accordingly, during middle or high speed traveling of the vehicle caused by the speed change operation member whose operation degree is not lower than the certain value, the engine rotation speed is kept low so as to save fuel consumption and silence the engine.

Further preferably, as the operation degree of the speed change operation member is increased after the speed ratio increased by the second increase rate of the speed ratio reaches a limit value, the engine rotation speed is increased by a third increase rate of the engine rotation speed so that the vehicle traveling speed reaches a maximum value to correspond to the maximum value of the operation degree of the speed change operation member.

Due to the setting of the third increase rate of the engine rotation speed after the speed ratio reaches the limited value, the proportional increase of the vehicle traveling speed, similar to a passage car, can be kept till the operation degree of the speed change operation member reaches the maximum value.

Preferably, depending on a parameter, the first increase rate of the engine rotation speed is increased/decreased, and the first increase rate of the speed ratio is complementarily decreased/increased to complement the increase or decrease of the first increase rate of the engine rotation speed.

Accordingly, the engine and the stepless speed change mechanism can be stably driven with the first increase rate of the engine rotation speed and the first increase rate of the speed ratio, respectively, during low speed traveling or during an early stage of acceleration corresponding to the range of the operation degree of the speed change operation member from 0 to the certain value.

Preferably, an operation speed of the speed change operation member serves as the parameter, wherein, when the operation speed is high, the first increase rate of the engine rotation speed is increased, and the first increase rate of the speed ratio is complementarily decreased.

Accordingly, when the speed change operation member is quickly operated for rapid acceleration, the engine rotation, whose change response is quicker than that of the speed ratio of the stepless speed change mechanism, is increased by the increased first increase rate of the engine rotation speed, thereby quickly obtaining the required vehicle traveling speed. Furthermore, due to the complementary reduction of the first increase rate of the speed ratio, the final increase amount of the vehicle traveling speed in response to the acceleration operation of the speed change operation member can be substantially equal to that when the speed change operation member is operated slowly.

Further preferably, when the vehicle traveling speed increased by the quick operation of the speed change operation member reaches a desired speed, the first increase rate of the engine rotation speed and the first increase rate of the speed ratio are returned to their original values.

Accordingly, the engine and the stepless speed change mechanism return into the original drive condition set for saving fuel consumption and for silencing the engine.

Otherwise, preferably, a weight of the vehicle or of load on the vehicle serves as the parameter, wherein, when the weight is large, the first increase rate of the engine rotation speed is increased, and the first increase rate of the speed ratio is complementarily decreased.

Accordingly, during the low speed traveling and the early stage of acceleration corresponding to the range of the operation degree from 0 to the certain value, the increased engine rotation speed compensates for the engine load caused by the weight so as to prevent stalling of the engine.

Otherwise, preferably, existence of overrun of the vehicle serves as the parameter, wherein, the overrun is detected, the first increase rate of the engine rotation speed is decreased, and the first increase rate of the speed ratio is complementarily increased.

Accordingly, due to the increase of the speed ratio whose response to the speed change operation is slower than that of the engine rotation speed, excessive increase of the vehicle traveling speed caused by the overrun is prevented.

Whether the parameter is the weight or the existence of overrun, the first increase rate of the engine rotation speed and the first increase rate of the speed ratio are increased or decreased complementarily to each other, so as to keep the increase rate of vehicle traveling speed in response to the acceleration operation of the speed change operation member, whichever weight the vehicle or the load on the vehicle has, or whether the vehicle overruns or not.

Preferably, in a third aspect according to the first aspect, when it is detected that the engine or a traveling transmission system is overloaded, the increase rate of the engine rotation speed is increased to rapidly increase the engine rotation speed to a value corresponding to a maximum torque, and the increase rate of the speed ratio is complementarily decreased.

Accordingly, the overload condition is solved so that the engine is prevented from stalling and the vehicle is prevented from being rapidly accelerated.

Preferably, in a fourth aspect according to the first aspect, as the operation degree of the speed change operation member is increased from 0 to the maximum value, the engine rotation speed is increased by the increase rate of the engine rotation speed which is gradually increased from a small value, and the speed ratio is complementarily increased by the increase rate of the speed ratio which is gradually decreased from a large value.

Accordingly, the engine rotation speed is kept low during low speed traveling of the vehicle or during an early stage of acceleration of the vehicle, thereby saving fuel consumption and reducing noise. In the whole traveling speed range of the vehicle by operating the speed change operation member, there is no turning point where the increase rates of the engine rotation speed and the speed ratio are suddenly changed, thereby preventing shock. It means that accurate synchronization of the turning point of the increase rate of the engine rotation speed (switching between the first increase rate and the smaller second increase rate (or 0)) to the turning point of the increase rate of the speed ratio (switching between the first increase rate and the larger second increase rate), which is required by the method of the second aspect, is unnecessary.

Preferably, in a fifth aspect according to the first aspect, in an early stage of increasing the operation degree of the speed change operation member from 0 to a small value, the engine rotation speed and the speed ratio are controlled by either a first control or a second control selected depending on a parameter. By the first control, according to increase of the operation degree, the engine rotation speed is complementarily increased by a certain increase ratio of the engine rotation speed, and the speed ratio is increased by a certain increase ratio of the speed ratio. By the second control, according to increase of the operation degree, the engine rotation speed is increased by another increase ratio of the engine rotation speed which is larger than the certain increase ratio of the engine rotation speed, and the speed ratio is complementarily increased by another increase ratio of the speed ratio which is smaller than the certain increase ratio of the speed ratio.

Accordingly, whether the first control for saving fuel consumption and reducing noise or the second control for quick acceleration and resistance to load is selected, the engine and the stepless speed change mechanism can be optimally driven during the low speed traveling or the early stage of acceleration.

In a sixth aspect, preferably, an operation speed of the speed change operation member serves as the parameter, wherein the first control is selected when the operation speed is lower than a fixed value, and the second control is selected when the operation speed is not lower than the fixed value. Otherwise, preferably, a weight of the vehicle or of load on the vehicle serves as the parameter, wherein the first control is selected when the weight is lower than a fixed value, and the second control is selected when the weight is not lower than the fixed value. Otherwise, preferably, existence of overrun of the vehicle serves as the parameter, wherein the first control is selected when the overrun is detected and the second control is selected when the overrun is not detected.

Accordingly, the same effects as mentioned in the paragraphs [0019], [0023] and [0025] can be obtained.

In the first aspect, preferably, a hydrostatic stepless transmission (HST) serves as the stepless speed change mechanism. Otherwise, preferably, a combination of a hydrostatic stepless transmission and a mechanical transmission (HMT) serves as the stepless speed change mechanism.

Accordingly, whether the HST or the HMT serves as the stepless speed change transmission, an optimal stepless speed change characteristics can be obtained.

In the first aspect, preferably, a pedal serves as the speed change operation member, and a depression degree of the pedal serves as the operation degree of the speed change operation member.

Accordingly, only easy depression control of the pedal is required for simultaneously controlling the engine rotation speed and the speed ratio of the stepless speed change mechanism.

These and other objects, features and advantages will appear more fully from the following detailed description with the accompanying drawings.

BRIEF DESCRIPTION OF THE DRAWINGS

FIG. 8(1) illustrates a graph representing change of the speed ratio corresponding to an accelerator pedal depression angle, FIG. 8(2) illustrates a graph representing change of the engine rotation speed corresponding to the accelerator pedal depression angle, and FIG. 8(3) illustrates a graph representing change of the vehicle traveling speed corresponding to the accelerator pedal depression angle.

FIG. 9(1) illustrates a graph representing change of the speed ratio corresponding to an accelerator pedal depression angle, FIG. 9(2) illustrates a graph representing change of the engine rotation speed corresponding to the accelerator pedal depression angle, and FIG. 9(3) illustrates a graph representing change of the vehicle traveling speed corresponding to the accelerator pedal depression angle.

FIG. 10(1) illustrates a graph representing change of the speed ratio corresponding to an accelerator pedal depression angle, FIG. 10(2) illustrates a graph representing change of the engine rotation speed corresponding to the accelerator pedal depression angle, and FIG. 10(3) illustrates a graph representing change of the vehicle traveling speed corresponding to the accelerator pedal depression angle.

FIG. 11(1) illustrates a graph representing change of the speed ratio corresponding to an accelerator pedal depression angle, FIG. 11(2) illustrates a graph representing change of the engine rotation speed corresponding to the accelerator pedal depression angle, and FIG. 11(3) illustrates a graph representing change of the vehicle traveling speed corresponding to the accelerator pedal depression angle.

DETAILED DESCRIPTION OF THE INVENTION

Figure 1:
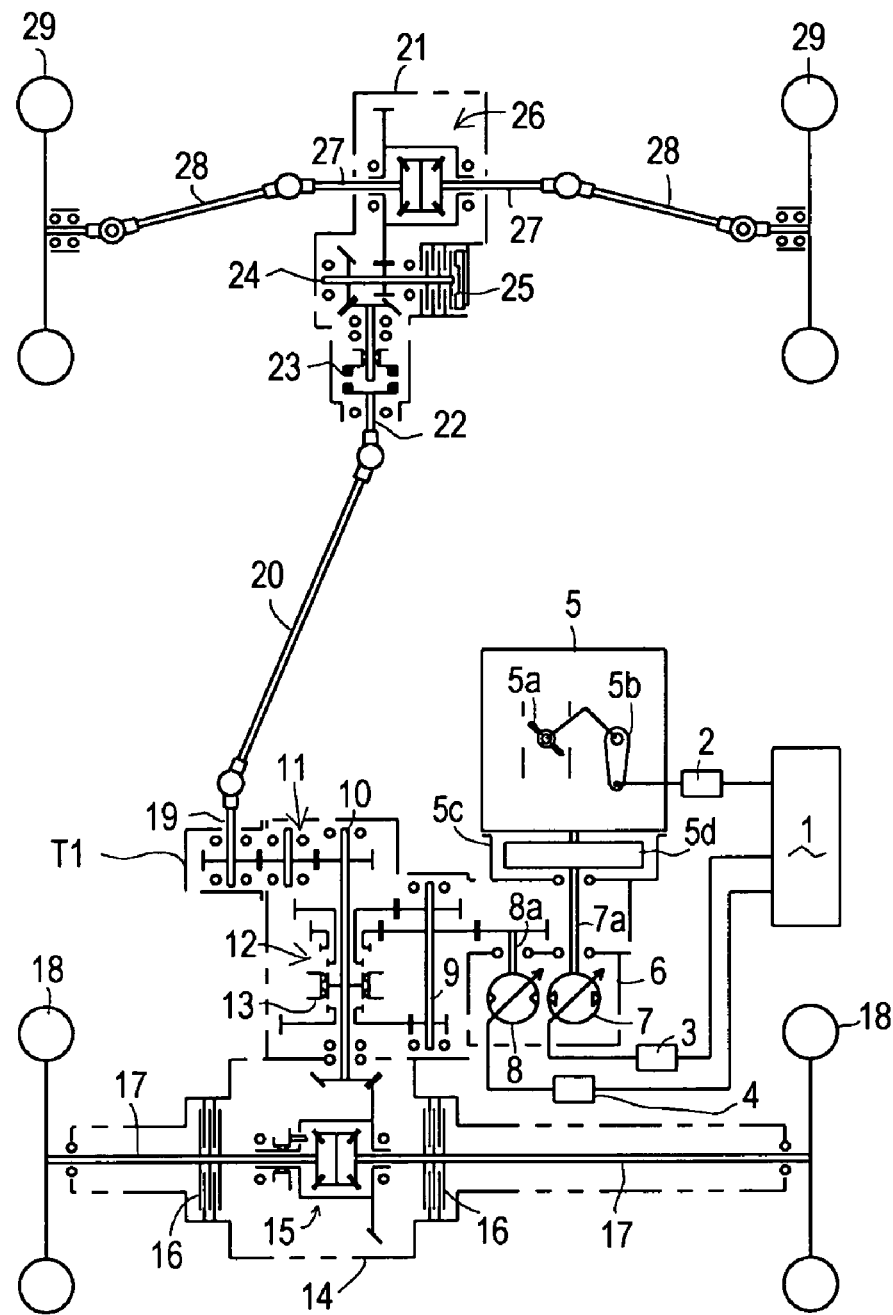
FIG. 1 is a skeleton diagram of a first embodiment of a traveling transmission system of a working vehicle, including an HST serving as a main speed change mechanism, to which an electronic governor according to the present invention is applied.
Figure 2:
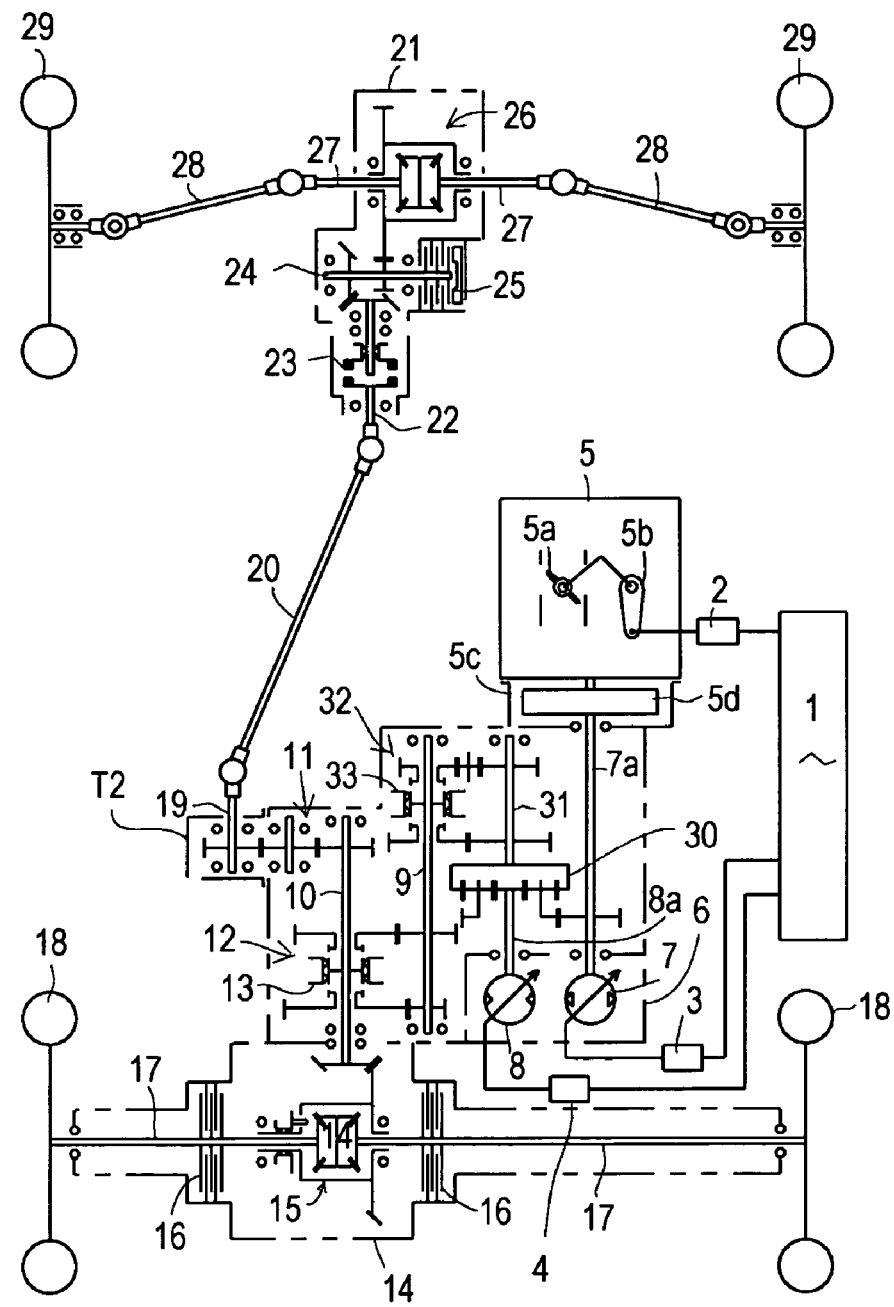
FIG. 2 is a skeleton diagram of a second embodiment of a traveling transmission system of a working vehicle, including an output dividing type HMT serving as a main speed change mechanism, to which an electronic governor according to the present invention is applied.
Figure 3:
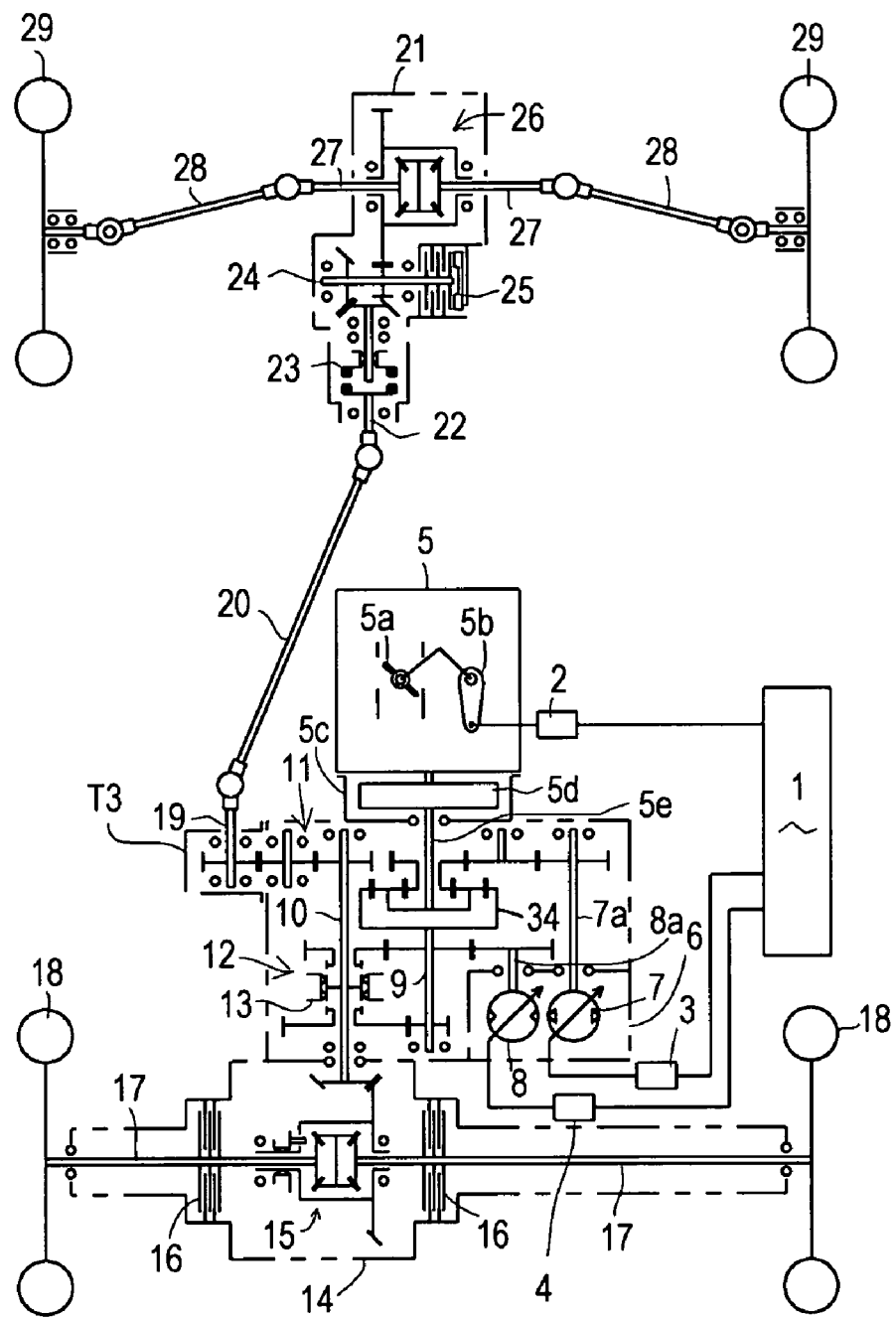
FIG. 3 is a skeleton diagram of a third embodiment of a traveling transmission system of a working vehicle, including an input dividing type HMT serving as a main speed change mechanism, to which an electronic governor according to the present invention is applied.

FIGS. 1 to 3 illustrate respective exemplary working vehicles employing the present invention. A working vehicle shown in FIG. 1 has an HST, serving as a stepless speed change mechanism, combined with a gear-type auxiliary speed change mechanism. Each of working vehicles shown in FIGS. 2 and 3 has an HMT, which is constructed by combining a HST with a planetary gear mechanism, serving as a stepless speed change mechanism, combined with a gear-type auxiliary speed change mechanism. The HMT in FIG. 2 combines torques of a pump shaft and a motor shaft of the HST with each other by planet gears. The HMT in FIG. 3 combines torques of an engine output shaft and an auxiliary speed change drive shaft for driving the auxiliary speed change mechanism with each other by planet gears.

Firstly, explanation will be given on a drive system of each of the vehicles in FIGS. 1 to 3. As a common construction among the vehicles, a flywheel 5d is fixed on an end of an output shaft of an engine 5, and is stored in a flywheel housing 5c attached to the engine 5. A rear axle casing 14 is disposed between left and right rear wheels 18. Either of a transmission casing T1 in FIG. 1, a transmission casing T2 in FIG. 2 and a transmission casing T3 in FIG. 3 is interposed between the flywheel housing 5c and the rear axle casing 14. An HST housing 6 is attached to either of the transmission casing T1, T2 and T3. A variable capacity type hydraulic pump 7 and a hydraulic motor 8 are disposed in the HST housing 6, and fluidly connected with each other so as to construct an HST. A front axle casing 21 is disposed between left and right front wheels 29. A transmission mechanism in the front axle casing 21 is interlockingly connected to the transmission mechanism in either of the transmission casing T1, T2 and T3 through a later-discussed transmission shaft 20 and the like.

In the rear axle casing 14, a differential gear mechanism 15 is interposed between left and right rear axles 17 extended from the respective rear wheels 18. A brake 16 is attached to each of the rear axles 17.

The front axle casing 21 pivotally supports left and right front axles 27, and in the front axle casing 21, a differential gear mechanism 26 is interposed between the front axles 27. Each of the front axles 27 is interlockingly connected to each of the front wheels 29 through universal joints and a transmission shaft 28.

The longitudinal positional relation between the rear wheels 18 with the rear axle casing 14 and the front wheels 29 with the front axle casing 21 is preferred, but may be alternatively exchanged. Namely, the vehicle to which the present invention is applied may alternatively be constructed so that the engine 5, the transmission casing and the axle casing 14 are disposed in front of the axle casing 21, so that the left and right wheels 18 disposed at the both sides of the axle casing 14 serve as front wheels, and the left and right wheels 29 disposed at the both sides of the axle casing 21 serve as rear wheels.

An input shaft 22 is projected rearward from the front axle casing 21 so as to be drivingly connected through the transmission shaft 20 and universal joints to a PTO shaft 19 projected from either of the transmission casing T1, T2 and T3. In the front axle casing 21, a lateral counter shaft 24 is pivotally supported, and a reduction gear train is constructed on the counter shaft 24. The input shaft 22 is interlockingly connected to the differential gear mechanism 26 through the reduction gear train. A clutch 23 is provided on the input shaft 22. By engaging the clutch 23, power is transmitted from the PTO shaft 19 through the input shaft 22 to the differential gear mechanism 26, thereby setting the vehicle into a four-wheel drive mode where the front wheels 29 is driven synchronously with the rear wheels 18. By disengaging the clutch 23, the vehicle is set into a two-wheel drive mode where power from the engine 5 is not transmitted to the front wheels 29 but to the rear wheels 18.

Each of the vehicles in FIGS. 1 to 3 has an electronic governor including a governor controller 1, a throttle actuator 2, a pump actuator 3 and a motor actuator 4, wherein the throttle actuator 2, the pump actuator 3 and the motor actuator 4 are electronically controlled by the governor controller 1. The throttle actuator 2 controls rotation of a throttle lever 5b interlockingly connected to a throttle valve 5a provided in a carburetor of the engine 5. The pump actuator 3 controls tilt of a movable swash plate of the hydraulic pump 7, and the motor actuator 4 controls tilt of a movable swash plate of the hydraulic motor 8.

Explanation will be given on construction of the speed change mechanism in either of the transmission casings T1, T2 and T3 and the HST housing 6 shown in FIGS. 1 to 3.

With regard to the speed change mechanism in FIG. 1, the HST in the HST housing 6, i.e., the mutually fluidly connected hydraulic pump 7 and motor 8, serves as a main speed change mechanism, and an auxiliary speed change gear mechanism 12 is constructed in the transmission casing T1 so as to receive the output of the HST serving as the main speed change mechanism.

Firstly, a pump shaft 7a of the hydraulic pump 7 extended from the HST housing 6 penetrates the transmission casing T1 and is connected to the flywheel 5d in the flywheel housing 5c. A motor shaft 8a of the hydraulic motor 8 is extended from the HST housing 6 into the transmission casing T1.

In the transmission casing T1, an auxiliary speed change drive shaft 9 is pivotally supported and engages with the motor shaft 8a through gears. An auxiliary speed change clutch shaft 10 is pivotally supported in the transmission casing T1, and extended in parallel to the auxiliary speed change drive shaft 9. One of opposite ends of the shaft 10 is inserted into the axle casing 14 and engages with a bull gear of the differential gear mechanism 15 through bevel gears.

A plurality of auxiliary speed change gear trains are interposed between the shafts 9 and 10 so as to constitute the auxiliary speed change gear mechanism 12. In this embodiment, three gear trains are constructed so as to provide three-stage auxiliary speed change. Namely, three auxiliary speed change driving gears are fixed on the auxiliary speed change drive shaft 9 and engage with respective three auxiliary speed change driven gears freely fitted on the auxiliary speed change clutch shaft 10. A clutch slider 13 is axially and slidably fitted on the auxiliary speed change clutch shaft 10 and is engaged with one of the driven gears so as to make the corresponding auxiliary speed change stage.

The auxiliary speed change clutch shaft 10 engages with the PTO shaft 19 through a PTO transmission gear mechanism 11. As mentioned above, the PTO shaft 19 is projected from the transmission casing T1, and drivingly connected through the transmission shaft 20 to the input shaft 22 projected from the front axle casing 21. In each of the transmission casings T2 and T3, as shown in FIGS. 2 and 3, is constructed the similar power train from the auxiliary speed change clutch shaft 10 to the PTO shaft 19 through the PTO transmission gear mechanism 11.

With regard to the speed change mechanism in FIG. 2, a HMT, which combines torque of the pump shaft 7a with torque of the motor shaft 8a by a planetary gear mechanism 30, is constructed as the main speed change mechanism. Namely, similarly to the embodiment in FIG. 1, the pump shaft 7a of the hydraulic pump 7 from the HST housing 6 penetrates the transmission casing T1 and is connected to the flywheel 5d in the flywheel housing 5c, and the motor shaft 8a of the hydraulic motor 8 is extended from the HST housing 6 into the transmission casing T1. However, with regard to the embodiment in FIG. 2, the pump shaft 7a is connected to the motor shaft 8a through the planetary gear mechanism 30, and a main speed change output shaft 31, which is rotated by rotational resultant force of the shafts 7a and 8a, is extended from the planetary gear mechanism 30.

The rotation direction of the motor shaft 8a is switched between opposite directions by the switching of slanting direction of the movable swash plate of the hydraulic pump 7. When the rotation direction of the motor shaft 8a is the same as that of the pump shaft 7a, the rotation of the main speed change output shaft 31 is accelerated by the pump shaft 7a and the motor shaft 8a. When the rotation direction of the motor shaft 8a is opposite to that of the pump shaft 7a, the torque of the motor shaft 8a reduces the pump shaft 7a, whereby the main speed change output shaft 31 is rotated corresponding to the difference of torque of the shafts 7a and 8a.

Similarly to the auxiliary speed change gear mechanism in the transmission casing T1, the auxiliary speed change gear mechanism 12 in the transmission casing T2 is interposed between the auxiliary speed change drive shaft 9 and the auxiliary speed change clutch shaft 10 engaging through gears with the differential gear mechanism 15 in the rear axle casing 14. However, the auxiliary speed change gear mechanism 12 of this embodiment has two stages of speed change, and two auxiliary speed change gear trains are provided between the shafts 9 and 10.

The main speed change output shaft 31 is interlockingly connected to the auxiliary speed change drive shaft 9 through a gear mechanism 32 comprising two gear trains, one of forward rotation and one of reverse rotation. The forward rotation gear train is constructed so that a driving gear fixed on the main speed change output shaft 31 directly engages with a driven gear freely fitted on the auxiliary speed change drive shaft 9. The reverse rotation gear train is constructed so that a driving gear fixed on the main speed change output shaft 31 engages through an idle gear with a driven gear freely fitted on the auxiliary speed change drive shaft 9. A clutch slider 33 is axially and slidably fitted on the auxiliary speed change drive shaft 9 and is engaged with one of the driven gears on the auxiliary speed change drive shaft 9 so as to turn the rotation of the auxiliary speed change drive shaft 9 into either the forward or reverse rotation.

With regard to the main speed change mechanism in FIG. 1 comprising only the HST, the rotation direction of the motor shaft 8a is turned into forward or reverse by switching the slanting direction of the movable swash plate of the hydraulic pump 7. However, with regard to the main speed change mechanism in FIG. 2 comprising the HMT, the rotation direction of the main speed change output shaft 31 is fixed regardless of the switching of rotation direction of the motor shaft 8a following the switching of slanting direction of the movable swash plate of the hydraulic pump 7. In detail, the torque of the motor shaft 8a is kept lower than the torque of the pump shaft 7a. Accordingly, even if the motor shaft 8a is rotated opposite to the pump shaft 7a, the main speed change output shaft 31 is not rotated reversely.

In this way, to reverse the rotation direction of the rear wheels 18 and the front wheels 29 following the forward/backward travel switching operation, it is necessary to provide a forward/reverse switching mechanism of the rotation direction at any point on the transmission way from the main speed change output shaft 31 to the auxiliary speed change clutch shaft 10. Therefore, in the transmission casing T2 in FIG. 2, the gear mechanism 32 having the forward/backward travel switching clutch is interposed between the main speed change output shaft 31 and the auxiliary speed change drive shaft 9.

Next, in the transmission casing T3 in FIG. 3, the HMT includes a planetary gear mechanism 34 for combining the torque of an engine output shaft 5e extended from the flywheel 5d with the torque of the auxiliary speed change drive shaft 9, thereby transmitting the resultant force to the pump shaft 7a of the HST hydraulic pump 7. The auxiliary speed change drive shaft 9 engages with the motor shaft 8a of the HST hydraulic motor 8 through a gear, and the auxiliary speed change gear mechanism 12 having high and low two speed stages is interposed between the auxiliary speed change drive shaft 9 and the auxiliary speed change clutch shaft 10. A clutch slider 13 is axially and slidably fitted on the auxiliary speed change clutch shaft 10 so as to engage either one of the gear trains of high and low stages with the auxiliary speed change clutch shaft 10.

With regard to the HMT as the main speed change mechanism in FIG. 3, the rotation of the motor shaft 8a can be reversed by the switching of slanting direction of the movable swash plate of the hydraulic pump 7, whereby the rotation of the auxiliary speed change drive shaft 9 engaging with the motor shaft 8a through the gears can also be reversed. Namely, the output rotation of the main speed change mechanism can be reversed by the switching of slanting direction of the movable swash plate of the hydraulic pump 7, whereby it is not necessary to provide such a mechanism for switching forward/rearward traveling direction as shown in FIG. 2.

At the time of forward traveling, the rotation direction of the auxiliary speed change drive shaft 9 determined by the slanting direction of the movable swash plate of the hydraulic pump 7 is opposite to that of the engine output shaft 5e. The result of reducing the rotation of the engine output shaft 5e by the auxiliary speed change drive shaft 9 is the output rotation of the planetary gear mechanism 34, and is transmitted to the pump shaft 7a so as to reduce the rotation of the pump shaft 7a. Namely, as the forward traveling set speed set by a main speed change operation member (for example, an accelerator pedal as discussed later) is increased, the rotation speed of the pump shaft 7a is reduced. Compensatively, the torque of the engine output shaft 5e assists the HST output, thereby improving the transmission efficiency of the main speed change mechanism. However, the reduced output rotation of the planetary gear mechanism 34 is not reversed before reaching the maximum forward traveling set speed, and therefore, the rotation of the pump shaft 7a is not reversed.

At the time of rearward traveling, the rotation direction of the auxiliary speed change drive shaft 9 is the same as that of the engine output shaft 5e. The result of accelerating the rotation of the engine output shaft 5e by the auxiliary speed change drive shaft 9 is the output rotation of the planetary gear mechanism 34, so that, as the rearward traveling set speed set by the main speed change operation member is increased, the rotation of the pump shaft 7a is accelerated. Accordingly, whether forward or rearward the vehicle travels, the rotation direction of the pump shaft 7a is fixed, and the forward/backward traveling direction is switched only by switching the slanting direction of the movable swash plate of the hydraulic pump 7.

With regard to the vehicle shown in each of FIGS. 1 to 3, preferably, an accelerator pedal or an accelerator lever is provided as a speed change operation member for setting the main speed level, i.e., the speed ratio of the main speed change mechanism, and the engine rotation speed can also be set simultaneously by operating the operation member. If an accelerator pedal serves as the operation member, the pedal comprises a pair of depressed parts, one of which is selectively depressed for setting either forward or rearward traveling speed. For example, the pedal may be shaped like a seesaw, pivoted at its longitudinal center, and having a front part to be depressed for setting forward traveling speed and a rear part to be depressed for setting rearward traveling speed. Alternatively, twin pedals may be laterally juxtaposed, so that one is depressed for setting forward traveling speed, and the other for setting rearward traveling speed. The vehicle traveling speed is changed in substantially proportion to the depressed amount of the respective depressed parts. The following description, especially of control by an electronic governor, is based on the assumption that the vehicle shown in each of FIGS. 1 to 3 is provided with the accelerator pedal serving as the main speed change operation member for setting either forward traveling speed or backward traveling speed.

Figure 4:
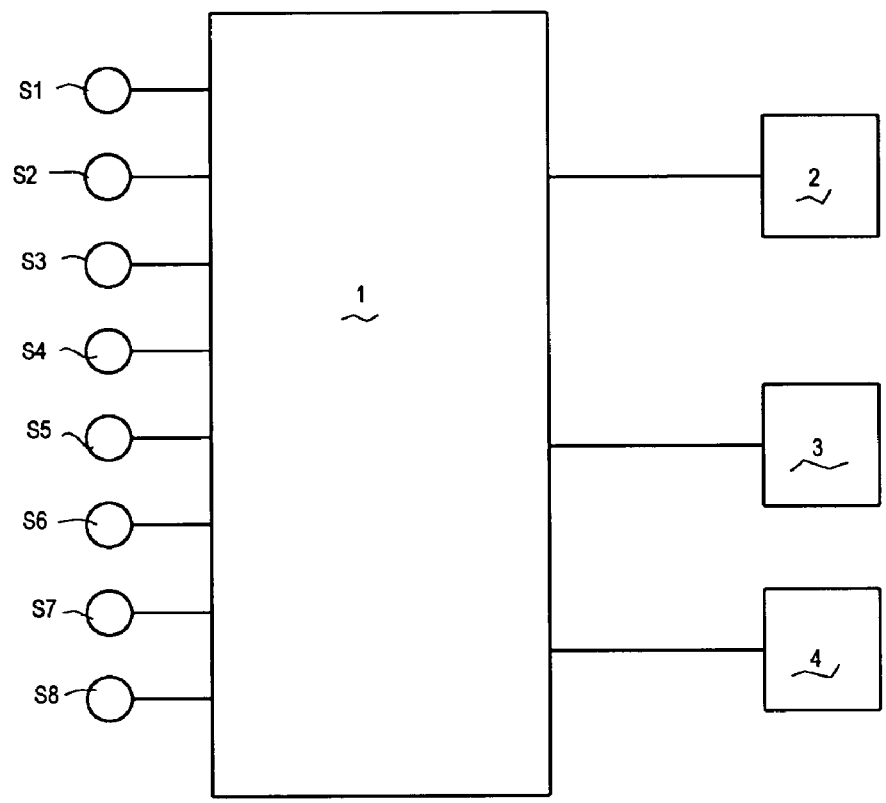
FIG. 4 is a block diagram of an electronic governor using a speed control method of the working vehicle according to the present invention.

Explanation will be given on an electronic governor system according to FIG. 4. The throttle actuator 2, the pump actuator 3 and the motor actuator 4 are electrically connected to an output interface of the electronic governor controller 1 so as to be electronically controlled by output signals from the electronic governor controller 1. On the other hand, an accelerator pedal depression angle sensor S1 for detecting an angle of the depressed accelerator pedal, an accelerator pedal depressing speed sensor S2 for detecting a depressing speed of the accelerator pedal, an engine load sensor S3 for detecting load on the engine 5, an engine rotation speed sensor S4 for detecting an output rotation speed of the engine 5, a vehicle traveling speed sensor S5 for detecting a traveling speed of the vehicle, a pump swash plate angle sensor S6 for detecting a slanting angle and direction of the movable swash plate of the hydraulic pump 7, a motor swash plate angle sensor S7 for detecting a slanting angle of the movable swash plate of the hydraulic motor 8, and a load weight sensor S8 for detecting a weight of load on the vehicle are electrically connected to an input interface of the electronic governor controller 1. In addition, the engine load sensor S3 can be replaced with an HST pressure sensor. Preferably, the vehicle traveling speed sensor S5 detects the rotation of the auxiliary speed change drive shaft 9 serving as the main speed change output shaft. However, the only required thing for the sensor S5 is to detect a rotation speed of rotary means corresponding to the vehicle traveling speed, for example, the rotation speed of the rear axle 17. The actuators 2, 3 and 4 are controlled based on the detected values of the sensors S1 to S8.

Figure 5:
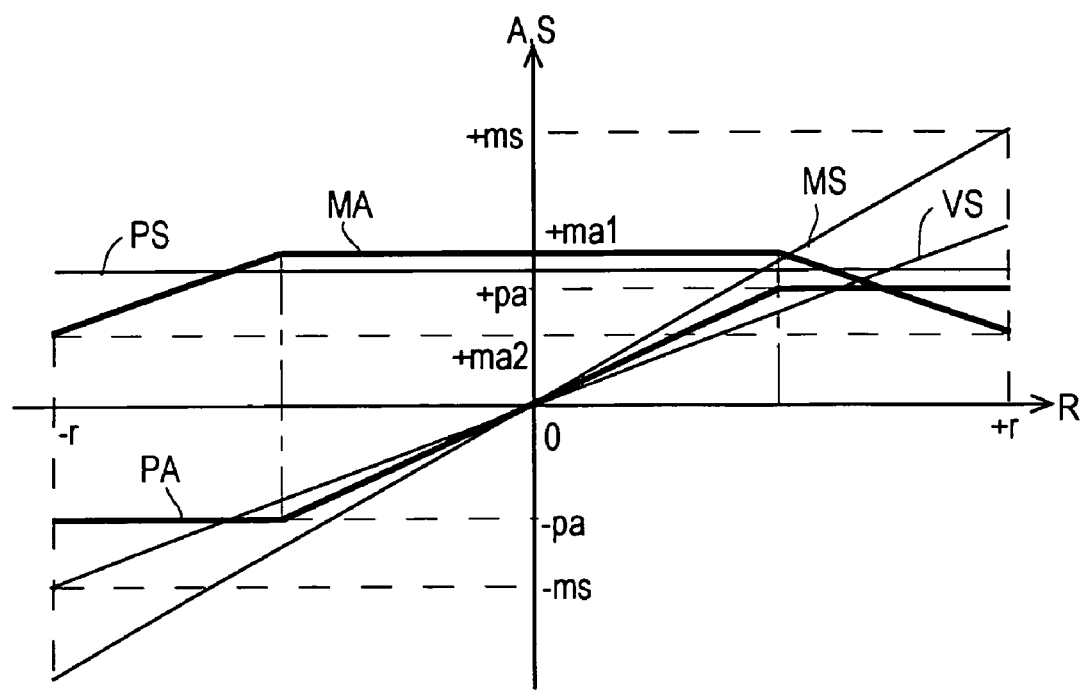
FIG. 5 illustrates graphs representing pump and motor swash plate angles and rotation speeds of pump and motor shafts, in relation to a speed ratio of the main speed change mechanism in FIG. 1.
Figure 6:
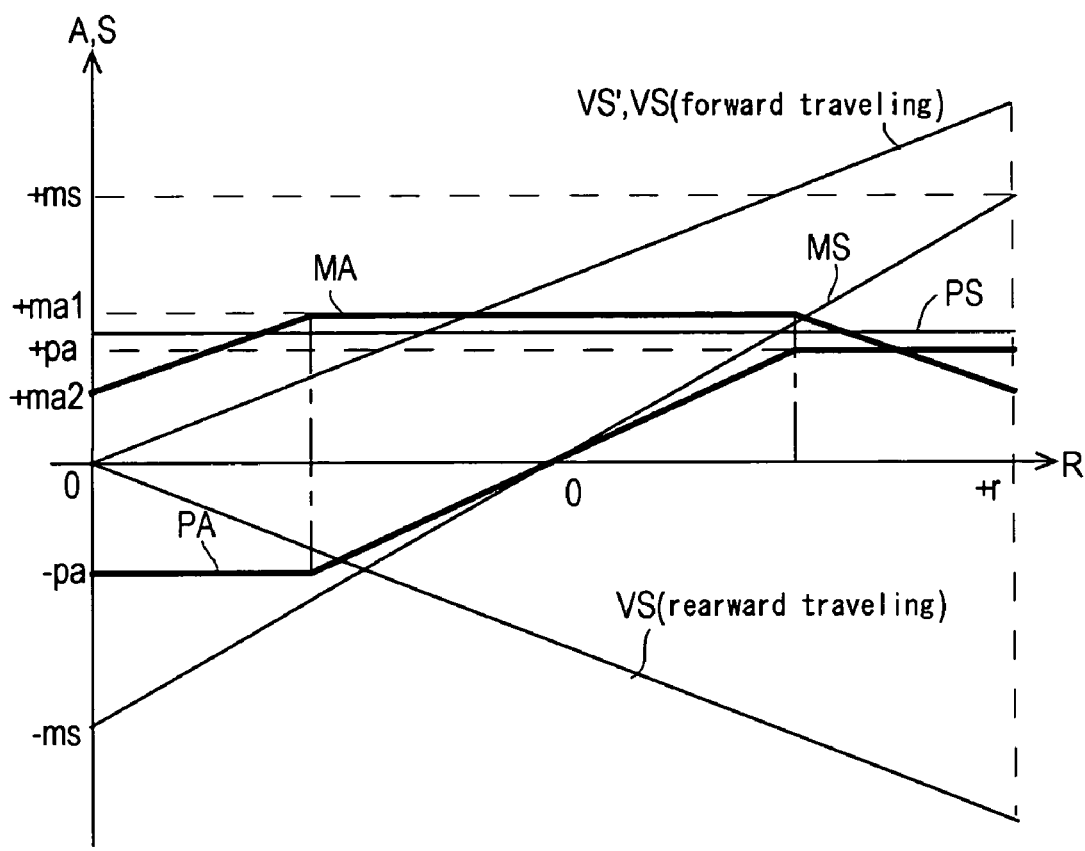
FIG. 6 illustrates graphs representing pump and motor swash plate angles and rotation speeds of pump and motor shafts, in relation to a speed ratio of the main speed change mechanism in FIG. 2.
Figure 7:
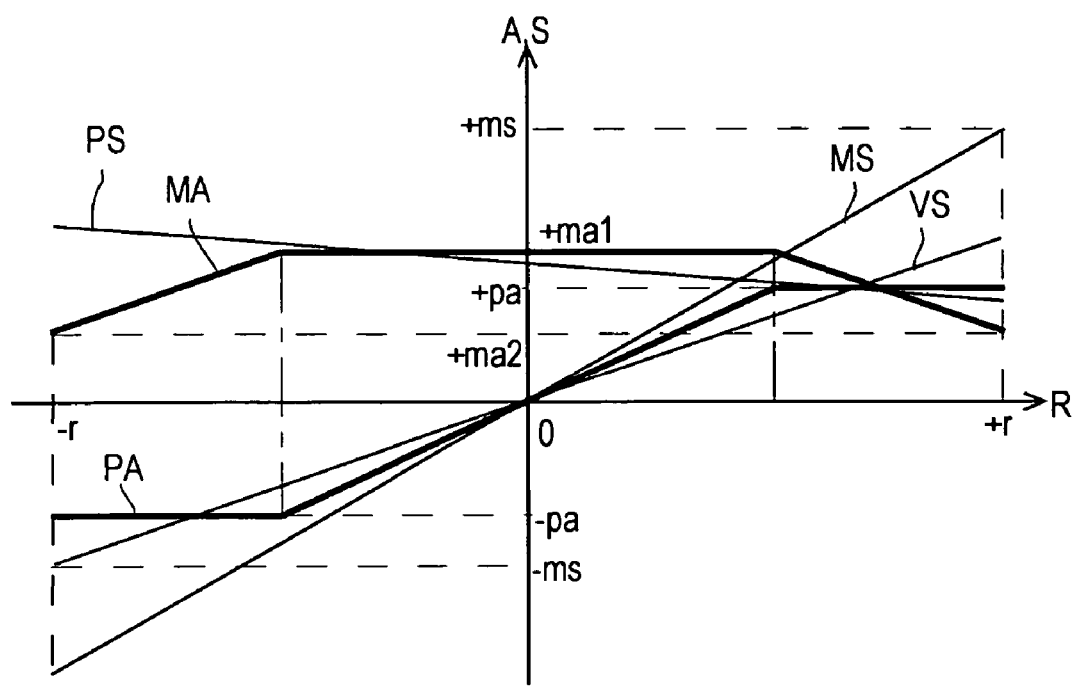
FIG. 7 illustrates graphs representing pump and motor swash plate angles and rotation speeds of pump and motor shafts, in relation to a speed ratio of the main speed change mechanism in FIG. 3.

Referring to FIGS. 5 to 7, explanation will be given on a relation between a speed ratio of each of the main speed change mechanisms of FIGS. 1 to 3 and swash plate angles of the hydraulic pump 7 and motor 8. The "speed ratio" means an output/input rotation speed ratio of the main (stepless) speed change mechanism. With respect to each of the main speed change mechanisms of FIGS. 1 to 3, the speed ratio is a calculated ratio of the rotation speed of the auxiliary speed change drive shaft 9, serving as the main speed change output shaft of each main speed change mechanism, to the rotation speed of the engine output shaft, on the assumption that the engine rotation speed is constant. Referring to FIG. 1, the speed ratio of the main speed change mechanism can be replaced with a rotation speed ratio of the motor shaft 8a to the pump shaft 7a, because the main speed change mechanism is the HST comprising the hydraulic pump 7 and the hydraulic motor 8.

FIGS. 5, 6 and 7 illustrate graphs representing the above-mentioned relations about the respective main speed change mechanisms of FIGS. 1, 2 and 3. In each graph, the horizontal axis indicates the speed ratio R. The point 0 indicates that the speed ratio is 0 (that is, the rotation speed of the auxiliary speed change drive shaft 9 is 0). A range on the right of the point 0 is referred to as a positive speed ratio range (from 0 to r (r>0)), and a range on the left of the point 0 is referred to as a negative speed ratio range (from 0 to −r). The vertical axis indicates the swash plate angle A. A range above the point 0 is referred to as a positive angle range, and a range below the point 0 is referred to as a negative angle range. A graph PA indicates variation of the pump swash plate angle, and a graph MA indicates variation of the motor swash plate angle.

In each of FIGS. 5 and 7, the positive ranges of the speed ratio R and the pump swash plate angle PA (from 0 to +r and from 0 to +pa) are assigned to the forward traveling, and the negative range thereof (from 0 to −r and from 0 to −pa) are assigned to the rearward traveling, because, with respect to each of the main speed change mechanisms shown in FIGS. 1 and 3, the operation for switching the slanting direction of the pump movable swash plate also serves as the operation for switching forward/rearward traveling.

In FIGS. 5 to 7, on the assumption that the engine rotation speed is fixed, the vertical axis also indicates the rotation speeds S of respective shafts including the pump shaft 7a and the motor shaft 8a. The range above the point 0 is assigned to as a positive rotation speed range (in FIGS. 1 and 3, especially, forward traveling rotation speed of the auxiliary speed change drive shaft 9), and a range below the point 0 is assigned to as a negative rotation speed range (in FIGS. 1 and 3, especially, rearward traveling rotation speed of the auxiliary speed change drive shaft 9). A graph PS indicates variation of the rotation speed of the pump shaft 7a (pump speed), and a graph MS indicates variation of the rotation speed of the motor shaft 8a (motor speed). A graph VS indicates variation of the rotation speed of the auxiliary speed change drive shaft 9 (main speed change output rotation speed. In addition, referring to FIG. 6, a graph VS' indicates variation of the rotation speed of the main speed change output shaft 31 of the main speed change mechanism in FIG. 2 (as the main speed change output speed before switching to forward traveling).

As shown in FIGS. 5 to 7, the farther the pump swash plate is slanted from the neutral position (PA=0) (0→+pa, 0→−pa), the higher each of the forward rotation speed (in FIGS. 1 and 3, the forward traveling rotation speed) and the rearward rotation speed (in FIGS. 1 and 3, the rearward traveling rotation speed) of the motor shaft 8a becomes. After the pump swash plate reaches the maximum slanting position (PA=+pa or −pa), the rotation speed of the motor shaft 8a is increased by decreasing the motor swash plate angle MA (+ma1 →+ma2). With regard to the main speed change mechanism shown in FIG. 1 or 3, wherein the forward/rearward traveling is switched by the switching of slanting direction of the pump movable swash plate of the HST, it is assumed that the speed ratio R is changed in direct proportion to the accelerator pedal depression angle. On this assumption, as the depression angle of the accelerator pedal for either forward traveling or rearward traveling is increased, the pump actuator 3 is driven so as to increase the pump swash plate angle PA from 0 to +pa at the time of forward traveling, or from 0 to −pa at the time of rearward traveling (to increase the volume of the pump 7). Meanwhile, the motor actuator 4 is stationary so as to fix the motor swash plate angle MA to the maximum value +ma1. When the accelerator pedal is depressed further after the pump swash plate angle PA reaches the maximum angle in the forward or backward traveling range (+pa or −pa), the motor actuator 4 is driven so as to reduce the motor swash plate angle MA (to decrease the volume of the motor 8) in proportion to the increase of the depression angle. Finally, the reduced motor swash plate angle MA reaches the minimum value +ma2, so that the motor speed MS reaches the maximum speed (+ms at the time of forward driving, or −ms at the time of rearward driving).

Referring to the main speed change mechanism in FIG. 1 comprising only the HST, as shown in FIG. 5, while the motor speed MS is changed from −ms through 0 to +ms by controlling the swash plates of the pump 7 and motor 8, the pump speed PS is fixed, and the rotation speed VS of the auxiliary speed change drive shaft 9, which engages with the motor shaft 8a through the reduction gears, is changed in proportion to the motor speed MS. When the pump swash plate angle PA and the motor speed MS are set to 0, the main speed change output speed VS also becomes 0, that is, the speed ratio R becomes 0.

The main speed change mechanism in FIG. 2 is the HMT which combines the torque of the pump shaft 7a directly connected to the engine output shaft with the torque of the motor shaft 8a by the planetary gear mechanism 30 so as to drive the main speed change output shaft 31 by the resultant force of the torques. As shown in FIG. 6, while the motor speed MS is changed from −ms through 0 to +ms by controlling the swash plates of the pump 7 and motor 8, the pump speed PS is fixed. When the pump swash plate angle PA is set to 0, the motor speed MS becomes 0. However, since the pump shaft 7a is driven, the rotation speed VS' of the main speed change output shaft 31 does not become 0. The planetary gear mechanism 30 is constructed so that the rotation speed VS' thereof is 0 (that is, the speed ratio R is 0) when the motor speed MS is the negative maximum value (−ms), that is, when the pump swash plate is disposed at the maximum slanting position in the rearward traveling rotation range (PA=−pa) and the motor swash plate is disposed at the minimum slanting position (MA=+ma2). Therefore, while the motor speed MS is changed from −ms through 0 to +ms, the rotation speed VS' (whose rotational direction is before selected into either the forward or rearward traveling direction) is increased proportionally. Accordingly, the main speed change output shaft 31 rotates in only one direction. Preferably, the clutch slider 33 is (automatically) switched immediately when the rotation speed VS' reaches 0 so that, afterward, either forward traveling rotation (VS>0) or rearward traveling rotation (VS<0) of the main speed change output shaft 31 is obtained by slanting the pump swash plate or the motor swash plate.

The main speed change mechanism in FIG. 3 is the HMT, wherein the rotation resultant force of the engine output shaft 5e and the motor shaft 8a are combined by the planetary gear mechanism 34, and transmitted to the pump shaft 7a. As shown in FIG. 7, while the motor speed MS is changed from −ms through 0 to +ms by controlling the swash plates of the pump 7 and motor 8, the rotation speed VS of the auxiliary speed change drive shaft 9, which engages with the motor shaft 8a through the reduction gear, is changed in proportion to the motor speed MS. When the pump swash plate angle PA is set to 0, the motor speed MS and the main speed change output speed VS become 0. By the rotation assistance by the planetary gear mechanism 34, the pump speed PS is reduced proportionally while the motor speed MS is changed from the negative maximum speed −ms to the positive maximum speed +ms. Namely, the pump speed PS is reduced in proportion to the increase of the set speed at the time of forward traveling, and is increased in proportion to the increase of the set speed at the time of rearward traveling.

Each of the electronic governor controllers 1 in FIGS. 1 to 3 memorizes each of the above correlations of FIGS. 5 to 7, i.e., variations of the angles of the movable swash plates of the pump 7 and motor 8 and of the rotation speeds of the shafts in relative to the speed ratio R (on the assumption that the engine rotation speed is fixed), and based on this memorized correlation, the electric governor controls the pump actuator 3 or the motor actuator 4 for moving the pump or motor swash plate in correspondence to the depression of the accelerator pedal.

Fundamentally, in correspondence to the depression angle of the accelerator pedal (that is, a value detected by the depression angle sensor S1), each of the electronic governors for controlling the main speed change mechanisms in FIGS. 1 to 3 drives the throttle actuator 2, and/or either the pump actuator 3 or the motor actuator 4 so as to increase the vehicle traveling speed substantially in proportion to the depression angle. The detection values of the engine rotation speed sensor S4, the vehicle traveling speed sensor S5 (which may be a rotation speed sensor of the auxiliary speed change drive shaft 9), the pump swash plate angle sensor S6 and the motor swash plate angle sensor S7 are used as the feedback.

To have the same speed change feeling as that of a passenger car, it is desired that the substantial proportional relation between the depression angle of the accelerator pedal and the vehicle traveling speed is kept whichever main speed is selected. Namely, each of the main speed change mechanisms in FIGS. 1 to 3 is required to change the rotation speed VS of the auxiliary speed change drive shaft 9 as the main speed change output shaft (whose rotational direction is after set into either the forward or rearward traveling direction) in proportion to the depression angle of the accelerator pedal. However, while keeping the above proportional relation between the depression angle of the accelerator pedal and the vehicle traveling speed, the relation between the change of the engine rotation speed caused by the throttle actuator 2 and the change of the HST speed ratio caused by the pump actuator 3 or the motor actuator 4 can be set into any pattern requested for the purpose of saving the load on the engine or for another purpose. Explanation will be given on embodiments of the control of the engine and the main speed change in various patterns of the relation between the change of the engine rotation speed and the change of the HST speed ratio according to FIGS. 8 to 11. The following explanation is limited to the case of forward traveling for convenience.

Figure 8:
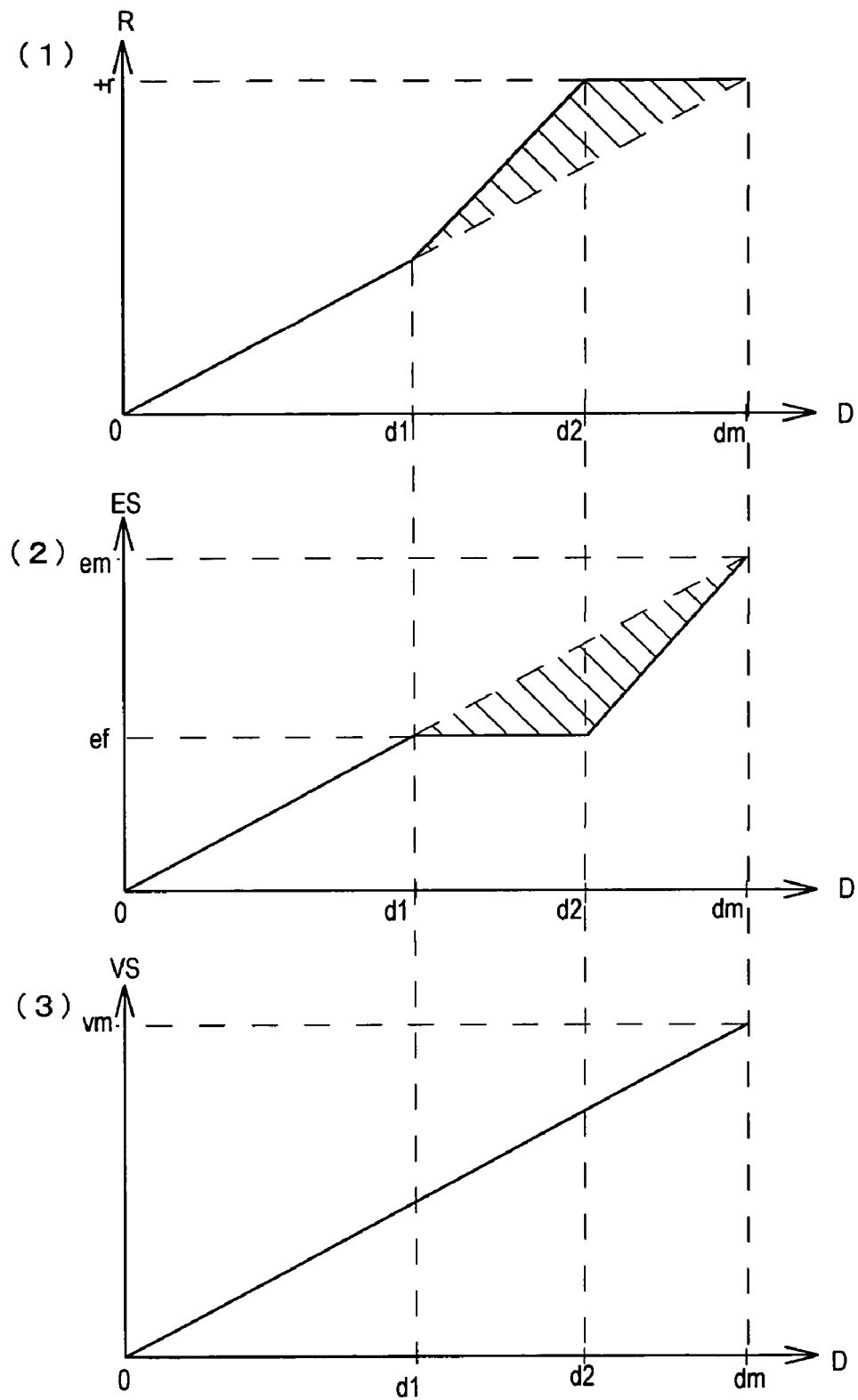
FIGS. 8(1), 8(2) and 8(3) illustrate graphs representing a first control of the engine rotation speed and the speed ratio according to the present invention.

In FIGS. 8 (1), 8(2) and 8(3), the engine rotation speed set in the middle or high speed range by the accelerator pedal is fixed to be a rated value. In each of FIGS. 8(1), 8(2) and 8(3), the horizontal axis indicates the depression angle D of the accelerator pedal (at the time of forward traveling). The vertical axis in FIG. 8(1) indicates the speed ratio R, that in FIG. 8(2) indicates the engine rotation speed ES, and that in FIG. 8(3) indicates the rotation speed VS of the auxiliary speed change drive shaft 9 (main speed change output speed). The reason why the rotation speed of the auxiliary speed change drive shaft 9 (the output shaft of the main speed change mechanism) is adopted to the vertical axis in FIG. 8(3) is only that its rotational is before set in speed by the auxiliary speed change unit and after set into either the forward or rearward traveling direction. Any rotation speed corresponding to the vehicle traveling speed (that is, corresponding to the detected value of the vehicle traveling speed sensor S5), such as the rotation speed of the rear axle 17, may alternatively be adopted. In the following explanation, "VS" is referred to as the vehicle traveling speed.

Firstly, as shown in FIGS. 8(1) and 8(2), when the depression angle D is within a range from 0 to d1, both the engine rotation speed ES and the speed ratio R are increased proportionally, that is, increased by respective fixed increase rates (a first increase rate of the engine rotation speed and a first increase rate of the speed ratio). Especially in the case of FIG. 1 or 3, the beginning change of the speed ratio R in response to this range of the depression angle D depends on change of the pump swash plate angle PA. Namely, corresponding to the increase of the depression angle D, the opening degree of the throttle valve 5a is increased by the control of the throttle actuator 2, and simultaneously, the pump swash plate angle PA is increased by the control of the pump actuator 3. After the pump swash plate angle PA reaches the maximum angle +pa before the depression angle D1 reaching d1, the motor swash plate angle MA is reduced from its maximum value +ma1 by the control of the motor actuator 4. Consequently, while the depression angle D is increased from 0 to d1, the vehicle traveling speed VS is increased by a fixed increase rate according to the increase of the depression angle D, as shown in FIG. 8(3).

When the depression angle D reaches d1, the engine rotation speed ES reaches a rated value ef, as shown in FIG. 8(2). Then, while the depression angle D is increased from d1, the engine rotation speed ES is kept to be the rated value ef so as to save fuel consumption and reduce noise. Alternatively, while the depression angle D is increased from d1, the engine rotation speed may not be the fixed value ef, but be increased by an increase rate (a second increase rate of the engine rotation speed) which is smaller than the first increase rate of the engine rotation speed ES set corresponding to the depression angle D between 0 and d1.

While the depression angle D is increased from d1, the speed ratio R is complementarily increased by a second increase ratio of the speed ratio, which is larger than the first increase ratio of the speed ratio, whether the engine rotation speed ES is fixed to the rated value ef or increased by the second increase ratio of the engine rotation speed. Consequently, while the depression angle D is increased from d1 (to a later-discussed value d2), the vehicle traveling speed VS is increased by the same increase ratio as that when the depression angle D is smaller than d1.

When the depression angle D reaches d2 larger than d1, the speed ratio R reaches its maximum value +r (that is, the motor swash plate angle MA reaches its minimum value +ma2). While the depression angle D is further increased from d2 to its maximum value dm, the speed ratio R is kept to be the maximum value +r (out of consideration of a later-discussed speed ratio control for preventing overload shown in FIGS. 11(1), 11(2) and 11(3)), and the engine rotation speed ES is increased from the rated value ef (or the value increased from the rated value ef by the second increase rate of the engine rotation speed) to its maximum value em by a third increase rate of the engine rotation speed which is larger than the first increase ratio of the engine rotation speed. Consequently, while the depression angle D is increased from 0 to the maximum value dm, the vehicle traveling speed VS is increased from 0 to the maximum speed vm by the fixed increase rate, i.e., proportionally, as shown in FIG. 8(3).

Figure 9:
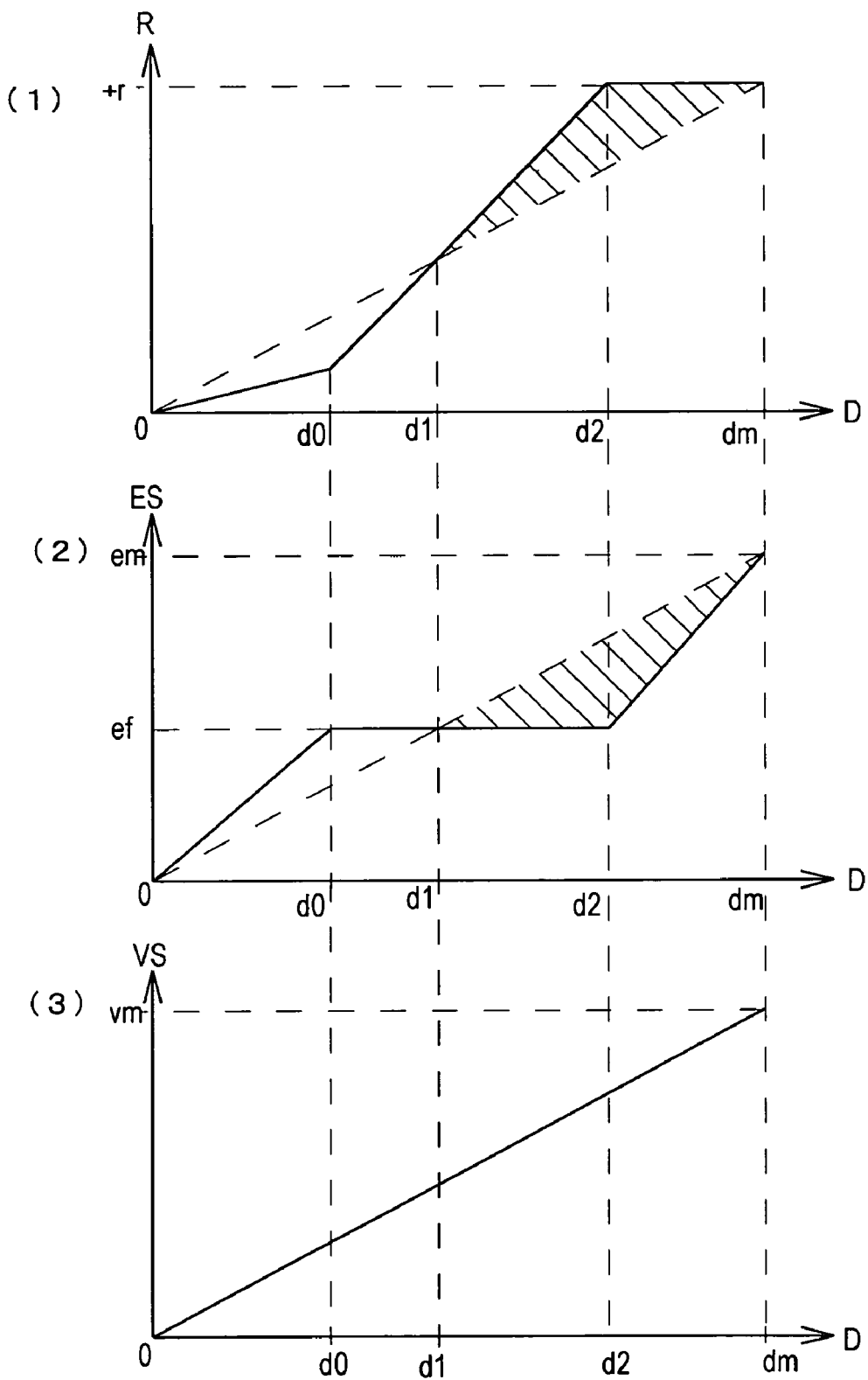
FIGS. 9(1), 9(2) and 9(3) illustrate graphs representing a second control of the engine rotation speed and the speed ratio according to the present invention.

FIGS. 9(1), 9(2) and 9(3) illustrates control graphs in another case where the engine rotation speed ES is set so as to quickly reach the rated value ef. In this regard, as shown in FIG. 9(2), when the depression angle D reaches d0 which is smaller than d1, the engine rotation speed ES reaches the rated value ef. While the depression angle D is increased from 0 to d0, the engine rotation speed ES is increased by an another first increase rate of the engine rotation speed, which is larger than the first increase rate of the engine rotation speed of the embodiment of FIGS. 8(1), 8(2) and 8(3). On the other hand, as shown in FIG. 9(1), during increase of the depression angle D of the accelerator pedal from 0 to d0, the speed ratio R is complementarily increased by another first increase rate of the speed ratio, which is smaller than the first increase rate of the speed ratio of the embodiment of FIGS. 8(1) to 8(3) so as to compensate for the increase of the first increase rate of the engine rotation speed. While the depression angle D is increased from d0 to d2, the engine rotation speed ES is kept to be the rated value ef, and the speed ratio R is increased and reaches the maximum value +r when the depression angle D reaches d2. Then, until the depression angle D increased from d2 reaches the maximum value dm, the speed ratio R is kept to be +r, and the engine rotation speed ES is increased to the maximum value (maximum torque value) em. According to this control, as shown in FIG. 9(3), the vehicle traveling speed VS is increased to the maximum speed vm in proportion to the depression angle D increasing from 0 to dm, similarly to the case shown in FIG. 8(3).

The electronic governor controller 1 memorizes respective maps represented in FIGS. 8(1) to 8(3) (represented as FIG. 8) and in FIGS. 9(1) to 9(3) (represented as FIG. 9), and selects which map is used for controlling the actuators 2, 3 and 4 depending on various parameters. One of the parameters is depressing speed of the accelerator pedal. In this regard, the map of FIG. 9 is selected when the value detected by the accelerator pedal depressing speed sensor S2 is not smaller than a threshold value, and the map of FIG. 8 is selected when the detected value is smaller than the threshold value. Quick depression of the accelerator pedal means that rapid acceleration is required. However, the reaction of the movement of the pump swash plate and the motor swash plate is slower than that of the movement of the throttle valve of the engine (the movement of the swash plate delays after the change of the pedal depression angle), so that satisfactory acceleration cannot be obtained by using the map of FIG. 8. Therefore, the map of FIG. 9 is used so as to quickly open the throttle valve 5a at an early stage of depression of the pedal, thereby rapidly increasing the vehicle traveling speed. On the other hand, when the depressing speed of the accelerator pedal is smaller than the threshold value, there is no gap of reaction speed between the movement of the throttle valve and the movement of the pump or motor swash plate. Accordingly, the map of FIG. 8 is used for setting the smaller increase rate of the engine rotation speed so as to save fuel consumption of the engine.

After the vehicle speed, which is increased according to the map of FIG. 9 selected because the detected value of the depressing speed sensor S2 is not smaller than the threshold value, reaches a required value, the map of FIG. 8 is selected for controlling the actuators 2, 3 and 4 so as to save the fuel consumption.

Another parameter is a weight of the vehicle or load on the vehicle, which is detected by the weight sensor S8. In this regard, when the detected weight is not smaller than a threshold value, the map represented in FIG. 9 is selected so as to keep the small speed ratio R (that is, to keep a large reduction ratio) especially at the time of starting the vehicle, thereby lightening the load stressed on the transmission system and rapidly increasing the engine rotation speed. When the detected weight is smaller than the threshold value, the map represented in FIG. 8 is selected so that the speed ratio R is increased by the large increase rate, and the engine rotation speed is increased by the small increase rate, thereby save fuel consumption during traveling of the vehicle. Furthermore, in the case that the electronic governor of this embodiment is mounted on a different designed vehicle, either of the maps of FIG. 8 and FIG. 9 may be selected to correspond to the weight of the vehicle. Namely, the map of FIG. 9 is selected for a heavy vehicle so as to reduce load on the transmission, and the map of FIG. 8 is adopted for a light vehicle so as to travel with low fuel consumption.

Moreover, it is considerable that the map of FIG. 9 is adopted for normal traveling and the map of FIG. 8 is adopted for emergency so as to prevent overrun of the vehicle. When the vehicle overruns at the time of going down a slope, the map of FIG. 8 is used so as to reduce the engine rotation speed ES, and to complementarily increase the speed ratio R. Namely, in this case, contrarily to the above cases, the increase of the vehicle traveling speed VS is defined as an abnormal condition. Therefore, the pump or motor swash plate is controlled prior to the throttle valve so as to dull the increase of the vehicle traveling speed VS in reaction to increase of the depression angle D, thereby preventing the vehicle from overrunning. It is considerable for detecting the overrun to use a result of comparing the detected values of the engine rotation speed sensor S4 and the vehicle traveling speed sensor S5 with each other, or a result of comparing the pump speed PA and the motor speed MA of the HST with each other. Namely, when the output speed is detected to be abnormally higher than the input speed, it is judged that the overrun occurs.

Figure 10:
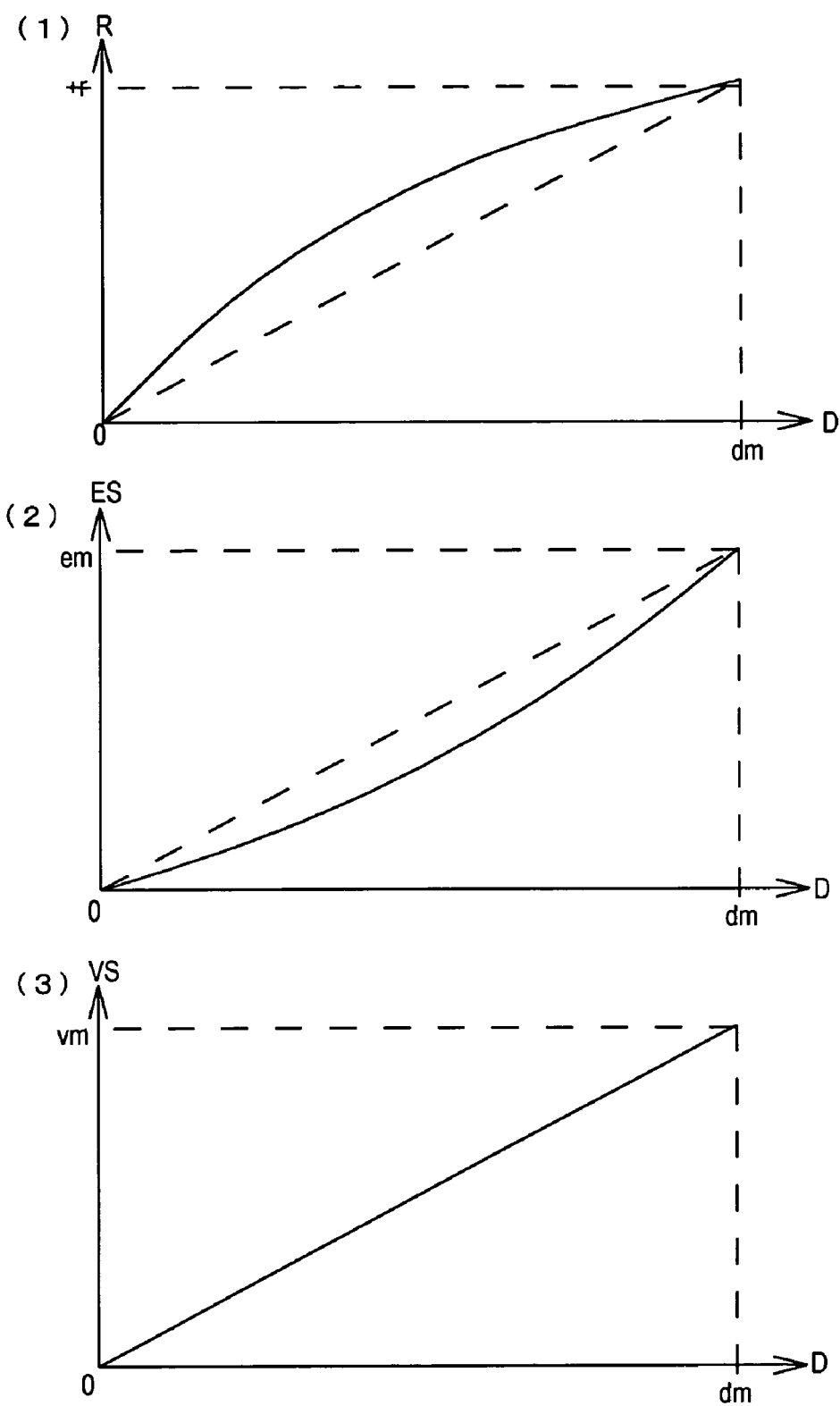
FIGS. 10(1), 10(2) and 10(3) illustrate graphs representing a third control, which is modification of the first control for control of the engine rotation speed and the speed ratio according to the present invention.

Instead of the map of FIG. 8, a map represented in FIGS. 10(1), 10(2) and 10(3) may be used as a control map for saving fuel consumption. In this map, as shown in FIG. 10(2), a small increase rate of the engine rotation speed ES is set immediately after starting of increasing the depression angle D from 0. As the depression angle D is increased to the maximum value dm, the engine rotation speed ES is increased to the maximum rotation speed em by the increase rate of the engine rotation speed ES, which is gradually increased from the small increase rate according to increase of the depression angle D. As a result, a graph of the whole variation of the engine rotation speed ES becomes a downward curved or convex line, as shown in FIG. 10(2). To complement such a change of the engine rotation speed, a large increase rate of the speed ratio R is set immediately after the start of increasing the depression angle D from 0. As the depression angle D is increased to the maximum value dm, the speed ratio R is increased to the maximum speed ratio +r by the increase rate of the speed ratio R, which is gradually reduced from the large increase rate according to increase of the depression angle D. As a result, a graph of the whole variation of the speed ratio R becomes an upward curved or concave line, as shown in FIG. 10(1). Accordingly, the vehicle traveling speed VS is increased by a constant increase rate (proportionally) according to increase of the depression angle D from 0, and reaches the maximum speed vm when the depression angle D reaches the maximum depression angle dm, as shown in FIG. 10(3).

Figure 11:
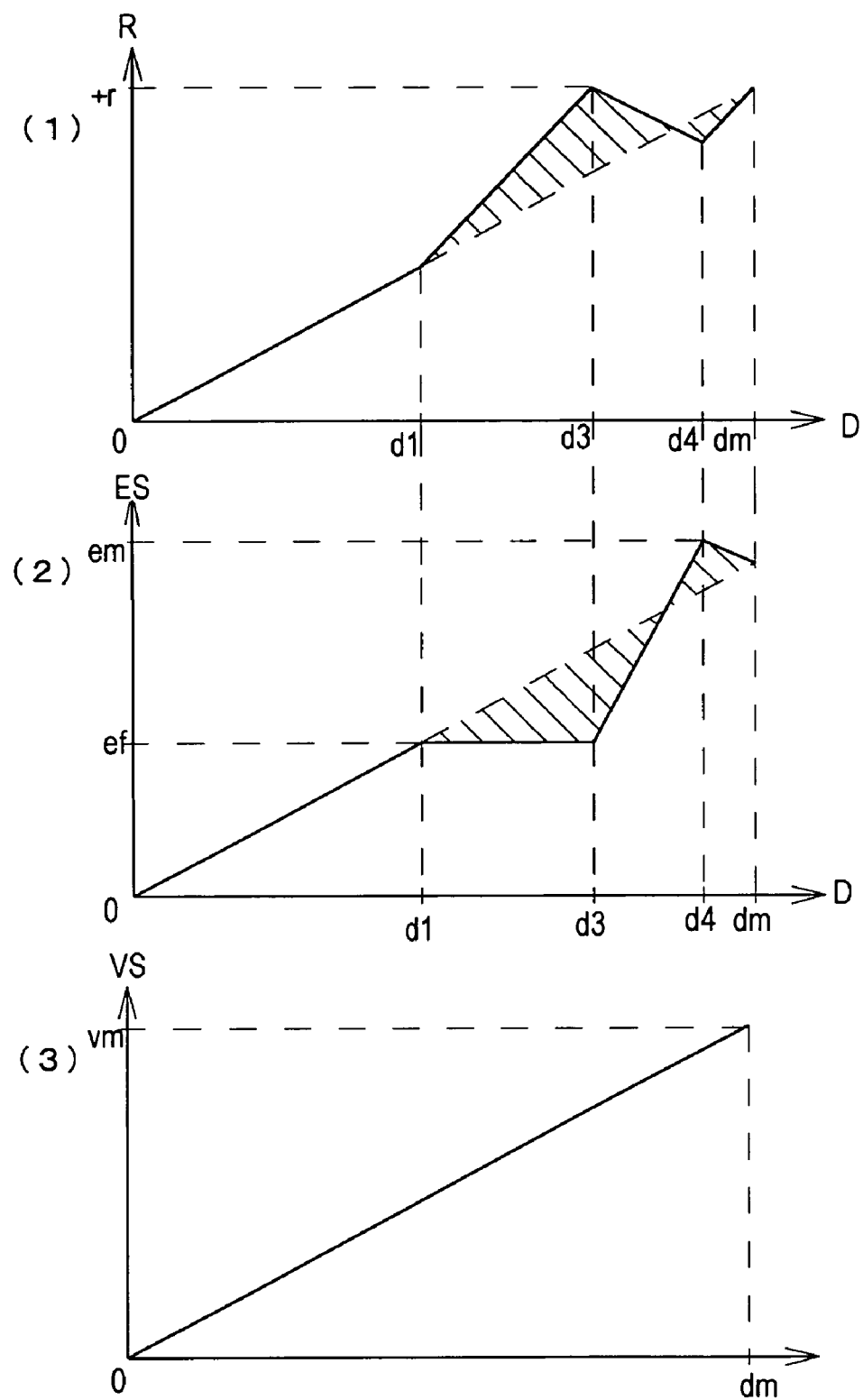
FIGS. 11(1), 11(2) and 11(3) illustrate graphs representing the first control modified for preventing overrun of the vehicle.

Next, explanation will be given on a control map represented in FIGS. 11(1), 11(2) and 11(3), serving as the control map of FIG. 8 modified for controlling at the time of detecting overload on the engine or the like. In FIGS. 11(1), 11(2) and 11(3), respective graphs are drawn on the assumption that the engine load sensor S3 detects overload of the engine while the depression angle D is fixed to be d3 (>d1) so as to travel the vehicle at a fixed speed (VS=vs1).

Firstly, with respect to the process of increasing the depression angle D to the value d3 (in this process, the detected value of the engine load sensor S3 is smaller than a threshold value), the throttle actuator 2 of the engine is controlled and/or the pump actuator 3 or motor actuator 4 of the main speed change mechanism is controlled according to a map similar to the map of FIG. 8, so as to increase the vehicle traveling speed VS while attaching importance to the reduction of fuel consumption. In this regard, while the depression angle D is increased from d1 to d3, the engine rotation speed ES is kept to be the rated value ef, and only the speed ratio R is increased so as to increase the vehicle traveling speed VS to vs1.

When the engine load sensor S3 detects that the load on the engine is not smaller than the threshold value during traveling at the fixed speed by fixing the depression angle D to be d3, that is, when the overload is detected, the accelerator pedal is depressed further by an operator or automatically. By this depression, the throttle actuator 2 is driven rapidly so that the engine rotation speed ES, which is essentially kept to be the rated value ef, is increased to the maximum torque value em (see FIG. 11(2)). Meanwhile, to keep the increase rate of the vehicle traveling speed VS in response to the depression angle D equal to that before this rapid control, the speed ratio R is reduced corresponding to the increase of the depression angle D (see FIG. 11(1)).

Accordingly, when the depression angle D reaches d4, the engine rotation speed ES reaches the maximum torque value em, and afterward, the depression angle d4 is kept so as to keep the constant engine rotation speed ES (em), thereby keeping the constant vehicle traveling speed. In addition, when the depression angle D becomes higher than d4, the engine rotation speed ES is reduced slightly from the maximum torque value em and the speed ratio R is increased compensatively for this reduction so as to keep the constant increase rate of the vehicle traveling speed VS in response to the depression angle D (keep the relation between the vehicle traveling speed VS (from 0 to vm) and the depression angle D (from 0 to dm) shown in FIG. 11(3)). Accordingly, when the detected value of the engine load sensor S3 becomes smaller than the threshold value during travel of the vehicle while keeping this high engine rotation speed, it is judged that the overrun state is canceled. The engine rotation speed ES is kept to be the maximum torque value em for a moment, and then the control is shifted to be based on the map of FIG. 8. The engine rotation speed ES is reduced to the rated value ef and the speed ratio R is changed for complementing this reduction so as to travel the vehicle at the fixed speed caused by the depression angle d3 (VS=vs1).

By adopting the present invention to a working vehicle, the same feeling of speed change as that of a passenger car can be obtained especially at the time of traveling on a road for moving to a working place, while ensuring the constant speed traveling at the time of working on the working place. An agricultural tractor, a truck and other working vehicles employing the present invention are superior in comfort, easy operativity, safety and the like.

It is further understood by those skilled in the art that the foregoing description is a preferred embodiment of the disclosed apparatus and that various changes and modifications may be made in the invention without departing from the spirit and scope thereof.

What is claimed is:

1. A speed control method for a working vehicle, increasing a vehicle traveling speed by changing an engine rotation speed and/or a speed ratio, as an output/input rotation speed ratio, of a stepless speed change mechanism in correspondence to increase of an operation degree of a speed change operation member, characterized in that an increase rate of the engine rotation speed and an increase rate of the speed ratio are changed complementarily to each other so that the vehicle traveling speed is increased by a substantially constant increase rate substantially in proportion to the increase of the operation degree of the speed change operation member from 0 to a maximum value.

2. The speed control method for a working vehicle as set forth in claim 1, wherein, as the operation degree of the speed change operation member is increased from 0 to a certain value, the engine rotation speed is increased by a first increase rate of the engine rotation speed so as to reach a rated value when the operation degree reaches the certain value, and the speed ratio is complementarily increased by a first increase rate of the speed ratio, and wherein, as the operation degree of the speed change operation member is increased from the certain value, the engine rotation speed is kept to be the rated value or increased by a second increase rate of the engine rotation speed which is smaller than the first increase rate of the engine rotation speed, and the speed ratio is complementarily increased by a second increase rate of the speed ratio which is larger than the first increase rate of the speed ratio.

3. The speed control method for a working vehicle as set forth in claim 2, wherein, as the operation degree of the speed change operation member is increased after the speed ratio increased by the second increase rate of the speed ratio reaches a limit value, the engine rotation speed is increased by a third increase rate of the engine rotation speed so that the vehicle traveling speed reaches a maximum value simultaneously to the operation degree reaching the maximum value.

4. The speed control method for a working vehicle as set forth in claim 2, wherein, depending on a parameter, the first increase rate of the engine rotation speed is increased or decreased, and the first increase rate of the speed ratio is complementarily decreased or increased so as to complement the increase or decrease of the first increase rate of the engine rotation speed.

5. The speed control method for a working vehicle as set forth in claim 4, wherein an operation speed of the speed change operation member serves as the parameter, and wherein, when the operation speed is high, the first increase rate of the engine rotation speed is increased, and the first increase rate of the speed ratio is complementarily decreased.

6. The speed control method for a working vehicle as set forth in claim 5, wherein, after the vehicle traveling speed increased by the quick operation of the speed change operation member reaches a desired speed, the first increase rate of the engine rotation speed and the first increase rate of the speed ratio are returned to their respective original values.

7. The speed control method for a working vehicle as set forth in claim 4, wherein a weight of a vehicle or of load on the vehicle serves as the parameter, and wherein, when the weight is large, the first increase rate of the engine rotation speed is increased, and the first increase rate of the speed ratio is complementarily decreased.

8. The speed control method for a working vehicle as set forth in claim 4, wherein existence of overrun of a vehicle serves as the parameter, and wherein, when the overrun is detected, the first increase rate of the engine rotation speed is decreased, and the first increase rate of the speed ratio is complementarily increased.

9. The speed control method for a working vehicle as set forth in claim 1, wherein, when it is detected that the engine or a traveling transmission system is overloaded, the increase rate of the engine rotation speed is increased to rapidly increase the engine rotation speed to its maximum torque value, and the increase rate of the speed ratio is complementarily decreased.

10. The speed control method for a working vehicle as set forth in claim 1, wherein, as the operation degree of the speed change operation member is increased from 0 to the maximum value, the engine rotation speed is increased by the increase rate of the engine rotation speed which is gradually increased from a small value, and the speed ratio is increased by the increase rate of the speed ratio which is gradually decreased from a large value.

11. The speed control method for a working vehicle as set forth in claim 1, wherein, in an early stage of increasing the operation degree of the speed change operation member from 0 to a small value, the engine rotation speed and the speed ratio are controlled by either a first control or a second control selected depending on a parameter, wherein, by the first control, according to increase of the operation degree, the engine rotation speed is increased by a certain increase ratio of the engine rotation speed, and the speed ratio is complementarily increased by a certain increase ratio of the speed ratio, and wherein, by the second control, according to increase of the operation degree, the engine rotation speed is increased by another increase ratio of the engine rotation speed which is larger than the certain increase ratio of the engine rotation speed, and the speed ratio is complementarily increased by another increase ratio of the speed ratio which is smaller than the certain increase ratio of the speed ratio.

12. The speed control method for a working vehicle as set forth in claim 11, wherein an operation speed of the speed change operation member serves as the parameter, wherein the first control is selected when the operation speed is lower than a certain value, and wherein the second control is selected when the operation speed is not lower than the certain value.

13. The speed control method for a working vehicle as set forth in claim 11, wherein a weight of a vehicle or of load on the vehicle serves as the parameter, wherein the first control is selected when the weight is lower than a certain value, and wherein the second control is selected when the weight is not lower than the certain value.

14. The speed control method for a working vehicle as set forth in claim 11, wherein existence of overrun of the vehicle serves as the parameter, wherein the first control is selected when the overrun is detected, and wherein the second control is selected when the overrun is not detected.

15. The speed control method for a working vehicle as set forth in claim 1, wherein a hydrostatic stepless transmission serves as the stepless speed change mechanism.

16. The speed control method for a working vehicle as set forth in claim 1, wherein a hydrostatic stepless transmission and a mechanical transmission are combined so as to serve as the stepless speed change mechanism.

17. The speed control method for a working vehicle as set forth in claim 1, wherein a pedal serves as the speed change operation member, and wherein a depression angle of the pedal serves as the operation degree.

* * * * *